May 1, 1962 L. J. BERRIDGE ET AL 3,032,371
VISOR ASSEMBLY
Filed June 26, 1959 3 Sheets-Sheet 3
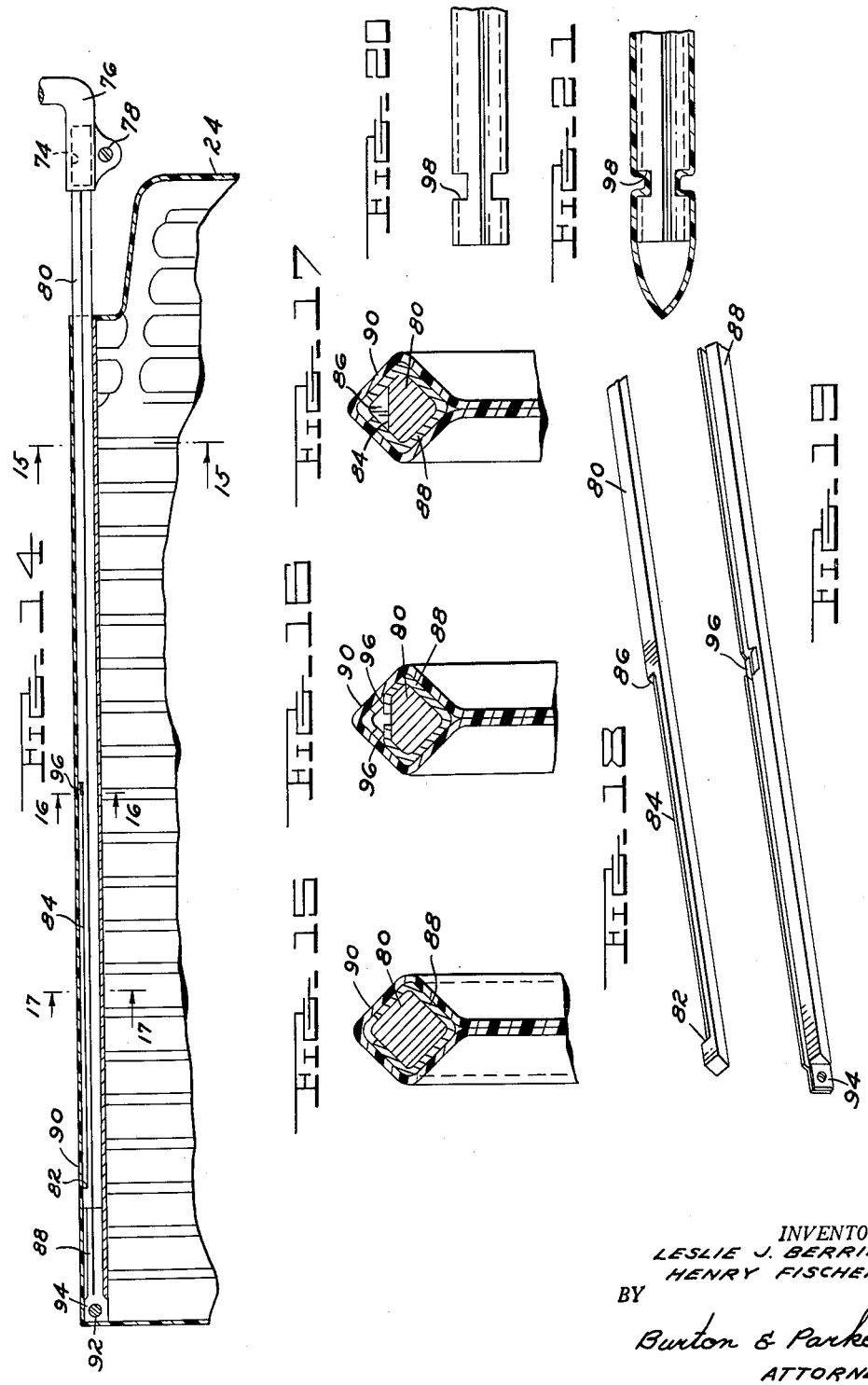
INVENTORS
LESLIE J. BERRIDGE
HENRY FISCHER
BY
Burton & Parker
ATTORNEYS

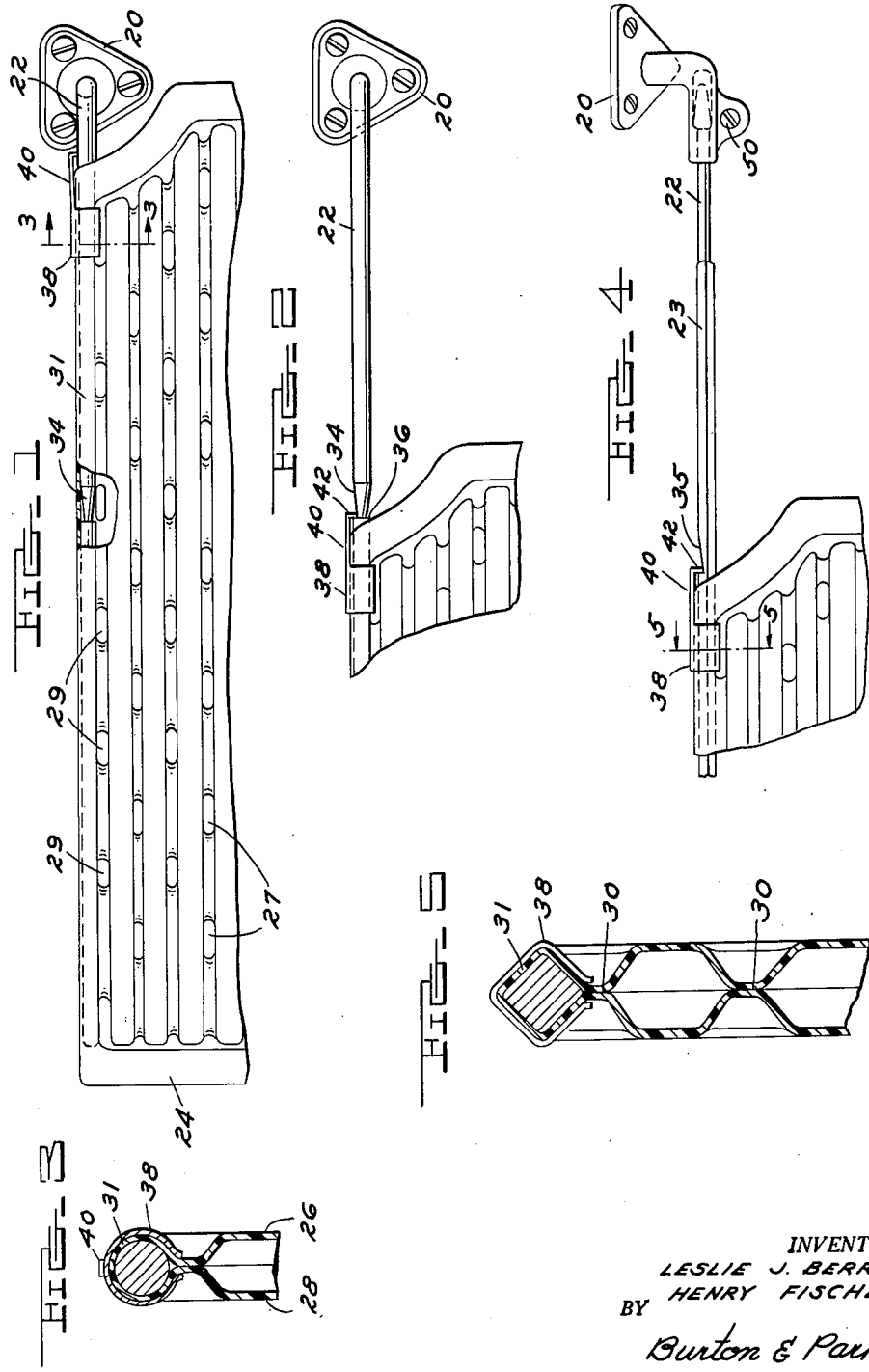

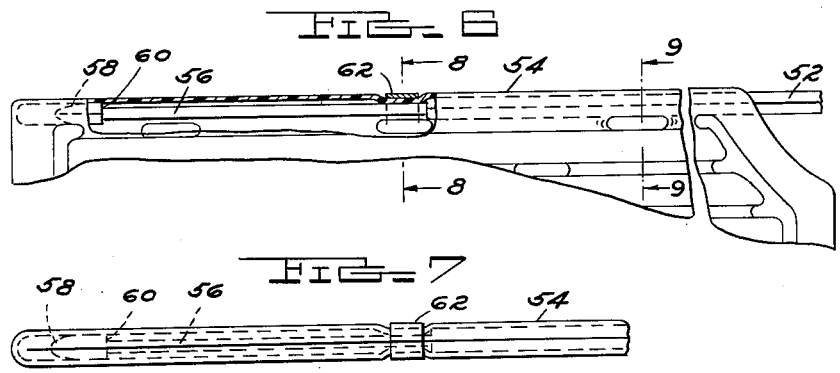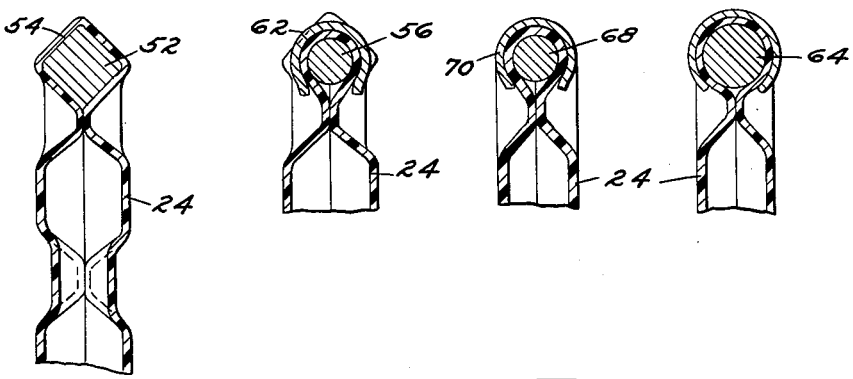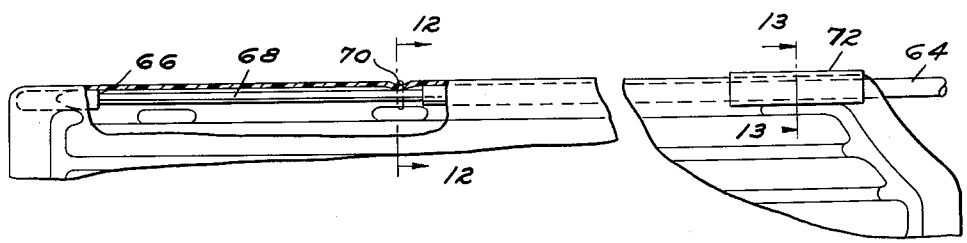

United States Patent Office 3,032,371
Patented May 1, 1962

3,032,371
VISOR ASSEMBLY
Leslie J. Berridge, Detroit, and Henry Fischer, Center Line, Mich., assignors to Woodall Industries, Incorporated, Detroit, Mich., a corporation of Michigan
Filed June 26, 1959, Ser. No. 823,044
3 Claims. (Cl. 296—97)

This invention relates to a visor assembly such as is provided for a motor vehicle.

Such a visor assembly is normally supported to overhang the windshield of an automobile body to protect the eyes of an occupant from the glare of the sun or advancing headlights. Such visor assembly commonly constitutes a visor blade, a visor-supporting bracket, and a visor-supporting rod carried by the bracket and upon which the visor blade is mounted.

It is also common practice to construct such an assembly in a manner which will permit the visor blade to be moved longitudinally along the rod to adjusted positions and supported at each of said positions and to also so mount the visor blade that it may be rotated to adjustable positions about its longitudinal axis so that it may be rotated from a sunlight-obstructing position to a non-obstructing position, and vice versa.

An object of this invention is to provide a visor assembly of the character hereinabove set forth which is of simple, inexpensive construction, which is of light weight, and wherein the several component parts may be readily assembled together and wherein the visor blade is so supported as to be moved readily to different positions of longitudinal adjustment along the rod but is releasably held against complete withdrawal from the rod; and wherein the blade is also supported so as to be rotated about its axis of longitudinal adjustment to a plurality of rotatable positions and releasably supported at each of said positions.

Another object is the provision of a visor assembly of the character hereinabove set forth wherein the visor-supporting rod is provided with a portion of reduced diameter which portion of reduced diameter terminates in a rod shoulder spaced from and between the ends of the rod, and which rod shoulder cooperates with a stop portion carried by the blade to limit the longitudinal withdrawal of the blade outwardly over the rod.

More particularly an object is the provision of a visor assembly as hereinabove described wherein the visor-supporting rod may be of circular cross section throughout its entire length and the visor blade is mounted thereon for longitudinal movement therealong to longitudinally adjusted positions or for rotatable movement thereabout to rotatably adjusted positions; or the rod may have a portion of its length of non-circular cross section over which the blade may be longitudinally but not rotatably adjustable and the rod itself is supported within the bracket for rotatable adjustment along with the blade to rotatably adjusted positions. In each of these above-described constructions the visor blade and the visor-supported rod upon which the rod is mounted are provided with cooperating stops, one being a shoulder formed on the rod adjacent to a reduced diameter portion of the rod and the other being a stop carried by the blade, and which stops limit the longitudinal adjustment of the blade over the rod. Normally the blade may have a longitudinal movement over the rod of 5″ or 6″.

Another object is the provision of a visor assembly of the character specified wherein the visor blade itself is a particularly light weight blade formed of complementary plastic sheets secured together by plastic bridging portions extending between the sheets and because of its light weight may be mounted upon the visor-supporting rod as hereinabove set forth. The assembly includes retaining means associated with the blade and the rod operable to hold the blade at positions of adjustment longitudinally along the rod or rotatably thereabout and the rod is provided with one portion of reduced diameter which terminates in a shoulder stop. The blade has associated therewith stop means slidable with the blade over the reduced diameter portion of the rod into abutting engagement with the shoulder stop of the rod to limit the longitudinal adjustment of the blade over the rod.

Different meritorious features are illustrated in the several modifications shown in the drawings and as to the precise construction of the visor-supporting rod and the particular stop means associated with the blade, such is hereinafter more specifically set forth.

Other objects, advantages, and meritorious features will more particularly appear from the following claims, specification, and accompanying drawings, wherein:

FIG. 1 is a fragmentary elevation of a visor assembly embodying the invention showing the blade mounted upon the rod at its nearest position of adjustment to the rod-supporting bracket.

FIG. 2 is a fragmentary elevation of the structure shown in FIG. 1 broken away showing the blade withdrawn outwardly to its outermost position with respect to the rod-supporting bracket.

FIG. 3 is a cross sectional view taken on the line 3—3 of FIG. 1;

FIG. 4 is an elevation of a fragment of a visor assembly similar to FIG. 2 except that the visor rod shown in FIG. 4 differs in detail from the visor rod shown in FIG. 2;

FIG. 5 is a cross sectional view through the rod and a fragment of the blade as shown in FIG. 4;

FIG. 6 is a side elevation of a fragment of an assembly such as shown in FIG. 1 but showing a modification as compared with FIG. 1;

FIG. 7 is a plan of a fragment of the upper margin of the assembly shown in FIG. 6;

FIG. 8 is a cross sectional view taken on the line 8—8 of FIG. 6;

FIG. 9 is a cross sectional view taken on the line 9—9 of FIG. 6;

FIG. 10 is a fragmentary elevation in cross section similar to that shown in FIG. 6 but illustrating a modified form of construction;

FIG. 11 is a plan of the upper margin of a portion of the modification shown in FIG. 10;

FIG. 12 is a cross sectional view taken on the line 12—12 of FIG. 10;

FIG. 13 is a cross sectional view taken on the line 13—13 of FIG. 10;

FIG. 14 is a longitudinal sectional view of a modified form of the invention as compared with the constructions of FIGS. 1, 6, and 10.

FIG. 15 is a cross sectional view taken on the line 15—15 of FIG. 14;

FIG. 16 is a cross sectional view taken on the line 16—16 of FIG. 14;

FIG. 17 is a cross sectional view taken on the line 17—17 of FIG. 14;

FIG. 18 is a perspective of a fragment of the blade-supporting rod shown in the modification of FIG. 14;

FIG. 19 is a perspective of a fragment of a tube which is received within the blade and surrounds the rod as shown in FIG. 14;

FIG. 20 is a fragmentary elevation of a portion of a visor rod of the character shown in FIG. 17, but somewhat modified;

FIG. 21 is a sectional view through a visor blade mounted on the rod of FIG. 20.

In FIG. 1 there is illustrated a conventional visor-supporting bracket 20 which is adapted to be secured as desired to the header within the interior of an automobile body above the windshield. This bracket is provided with a blade-supporting rod 22 which is generally so supported by the bracket that the visor blade carried on the rod may be swung from a position overlying or superposing the windshield to a position overlying a side window. This is conventional construction. Numeral 24 identifies a visor blade of the character such as is more particularly shown in application Serial No. 760,901 of James W. Greig assigned to the assignee of this application.

Such visor blade is illustrated and described more particularly in the aforesaid application. It comprises two plastic sheets 26 and 28 which are secured together around the margin of the blade and throughout the area thereof through being deformed at spaced intervals as at 27. These deformations are brought into contact as at 30 in FIG. 5 and fused together at such contact point forming bridging portions extending between the two sheets. Such method of bridging the two sheets in spaced-apart relationship provides a peculiarly rigid and strong structure of light weight. The bridging portions in FIG. 1 which extend along the tubular margin of the blade are identified as 29 and they are so disposed that they provide a tubular marginal socket portion 31 as shown in FIGS. 1, 3, and 5.

It is apparent that the visor blade might be otherwise formed than of plastic material. It might consist of flexible material folded about the rod to form a tubular portion thereabout or it might consist of a visor blade of some rigid material such as fiberboard having a tubular portion secured thereto so as to extend along one longitudinal margin thereof and constitute the marginal tubular portion of the blade. Such blade modifications are not shown in the drawing but they are well known to the trade.

The visor-supporting rod 22 as shown in FIGS. 1, 2, and 3 is a rod which is circular in cross section. It has a reduced diameter portion 34 which terminates spaced from the outer end of the rod in a rod shoulder 36. In other words the reduced diameter portion of the rod extends away from the shoulder 36 toward the supported end of the rod but terminates spaced therefrom. Normally the rod extends for substantially the length of the visor blade.

In the construction shown in FIGS. 1-3 (first modification) there is a tubular spring clip 38 which is grippingly received about the tubular margin 31 of the blade grippingly holding the same frictionally against the rod 22. This clip has a spring-like finger 40 which extends beyond the bracket end of the blade and has an inturned end portion 42. This inturned end portion extends into the reduced diameter portion 34 of the rod 22 when brought into position therewith. This inturned end portion is held resiliently against the reduced diameter portion 34 of the rod. The spring finger 40 of the spring clip 38 is sufficiently resilient so that its inturned end portion 42 may ride over the full diameter portion of the rod as well as over the reduced diameter portion, all as shown in FIG. 1. Such inturned end 42 is adapted to abut the rod shoulder 36 and provide a limit for outward longitudinal adjustment of the blade.

In FIGS. 4 and 5 (second modification) the construction is similar to that of FIGS. 1-3 except that the short end portion of the rod which is mounted within the bracket is of circular contour, the remainder of the rod having a long non-circular portion 23 which extends away from the circular portion 22 toward the outer end of the rod and this long outer end portion of the rod is provided with the reduced diameter portion 35 spaced from and between its ends that corresponds with the reduced diameter portion 34 of FIGS. 1, 2, and 3.

The spring clip 38 is identified by the same numeral applied to the corresponding clip in FIGS. 1, 2, and 3 and differs therefrom only in that instead of being circular in cross section, it is square in cross section. It is grippingly mounted upon the tubular margin of the blade which is also square in cross section. This clip has a spring finger 40 and an inturned end 42 on such spring finger. The reduced diameter portion 35 of the rod is similar to that shown and numbered 34 in FIGS. 1 and 2.

The operation of the structure shown in FIGS. 4 and 5 is similar to that in structure shown in FIGS. 2 and 3 except that in FIGS. 4 and 5 that end of the rod which is mounted within the bracket is held frictionally for permitted rotation within the bracket to rotatably adjusted positions. There is a tightening screw 50 which frictionally grips a split tube portion of the bracket about the end of the rod.

FIGS. 6, 7, 8, and 9 represent a third modification. The visor blade supporting rod 52 is itself supported at one end by a suitable bracket such as that shown in FIG. 4. It is so supported that it can be adjusted rotatably within the bracket to different positions of rotatable adjustment and maintains these positions. Such rod is shown as having a rectangular portion at the end adjacent to the part that is supported within the bracket. Due to the presence of this rectangular shape as shown particularly in FIG. 9, the blade 24 cannot be rotated about the rod. Such blade is slidably longitudinally adjustable over the rod and its tubular portion 54 is shown in FIG. 9 as being snugly received over the rod.

The rod has a reduced diameter portion 56 adjacent to its outer end 58. This reduced diameter portion is shown in FIGS. 6 and 8 as of a circular shape in cross section. The extreme end of the rod 58 exhibits a shoulder 60 which acts as a stop as hereinafter described. A clip or retaining element 62 is gripped about the tubular margin of the rod pinching the same down against the reduced diameter portion 56 of the rod. This construction is shown particularly in FIGS. 6, 7, and 8. The clip 62 is mounted upon the intermediate portion of the tubular margin 54 of the blade as shown.

Due to the clip 62 pinching the tubular margin of the blade closely about the reduced diameter portion 56 of the rod, the longitudinal adjustment of the rod is limited to the permitted extent of longitudinal movement of the reduced diameter length 56 of the rod within the tubular marginal portion of the blade which is constricted by the clip 62.

A fourth modification is illustrated in FIGS. 10, 11, 12, and 13. This modification resembles somewhat the construction of FIGS. 1-3 in that the rod is of a circular configuration throughout its entire length. Such rod is indicated as 64. It has adjacent to its outer end a shoulder 66. Extending away from the shoulder and toward the supported end of the rod it has a reduced diameter portion 68. A retaining clip 70 is provided. This clip is shown in FIG. 11 in the form of a wire instead of a flat band as illustrated at 62 in FIGS. 6 and 7. The purpose served, however, by the clip 70 is the same as that served by the clip 62. Such clip constricts the tubular margin of the blade closely about the reduced diameter portion 68 of the rod so that the longitudinal adjustment of the blade upon the rod is limited to the extent of movement permitted by the longitudinal adjustment of the reduced diameter portion 68 of the rod within the clip.

In order to hold the blade frictionally against the rod for more secure support of the blade at adjusted positions rotatably about the rod, a spring clip 72 is provided which is disposed adjacent to the inner end of the blade. This clip grips the tubular margin of the blade snugly about the portion 64 of the rod whereby the blade is held frictionally releasably at adjusted positions of rotation about the rod and in this construction the blade is not only adjustable along the rod but rotatable there about. This construction therefore differs from that shown in FIGS. 6–9 in that in such figures (6–9) the adjustable rotation of the blade is accomplished by rotating the rod itself within the bracket as heretofore described in connection with FIG. 4.

A fifth modification is illustrated in FIGS. 14–19. This modification is one wherein the blade 24 is adjustable longitudinally over the rod but to accomplish the rotatable adjustment of the blade, the blade and the rod rotate as a unit within the bracket. The end 74 of the rod is frictionally supported within a bracket 76 which bracket has a split tubular portion which is constricted frictionally about the end 74 of the rod by a tightening screw 78 in a manner which is conventional. That portion of the rod which extends outwardly away from the end 74 and is indicated as 80 is shown as square in cross section. The rod itself is shown in perspective in FIG. 18. In this figure it will be seen that the rod is provided adjacent to its outer end with a shoulder 82. A reduced diameter length 84 extends away from the shoulder toward the supported end of the rod and terminates with an opposing shoulder 86, all as shown in FIG. 18.

In order to provide a better mounting and support of the blade upon the rod and a more rugged construction, a split tube generally square in cross section is indicated in FIG. 19 at 88, and is mounted within the tubular margin 90 of the blade. This tube is of a size and shape to be slidably fitted over the rod 80. The rod 80 has a slip fit within the tube 88 so that the blade may be longitudinally adjusted over the rod. The tube is held within the blade by rivet 92 or the like which extends through an apertured end portion 94 of the tube as shown in FIGS. 14 and 19.

A portion of the opposite side walls of the tube are inturned as at 96 against the reduced diameter portion 84 of the rod. This is shown particularly in FIGS. 16 and 19. When the blade is moved longitudinally over the rod away from its bracket support, shoulder 82 will come in contact with these inturned portions 96 limiting the outward movement of the blade. When the blade is moved in the opposite direction and toward the bracket, the shoulder 86 of the rod will be brought into abutment with the inturned walls 96 of the tube.

In FIGS. 14–17 a rivet 92 is shown as securing the tube 88 within the tubular portion of the blade. In FIGS. 20 and 21 instead of such rivet, the tube has opposite corners cut away as at 98 and into these cutouts the opposite corners of the tubular margin of the blade are bent thereby holding the tube 88 within the tubular margin 90 of the blade.

These several modifications represent alternative selections which embody the same general construction but differ in details from each other. There is an assembly that comprises: a visor blade, a visor bracket provided with a blade-supporting rod upon which the blade is mounted, and wherein the blade is shiftable longitudinally with respect to the rod for adjustment longitudinally thereover to different positions, and wherein the blade is rotatably shiftable either about the rod or with the rod to adjusted positions of rotation, and wherein the rod itself is provided with a shoulder adjacent a reduced diameter portion which extends inwardly away from the shoulder toward the supported end of the rod, and wherein such shoulder is adapted to be brought into abutment with a stop carried by the blade to limit longitudinal adjustment of the blade over the rod. Such stop carried by the blade takes different forms.

What we claim is:

1. A visor assembly comprising, in combination: a visor blade; a visor blade-supporting bracket provided with a visor blade-supporting rod supported from one end by the bracket; said blade having a tubular portion extending along one longitudinal margin and mounted upon the rod for adjustment of the blade longitudinally over the rod and rotatable about an axis coincident with the longitudinal axis of the rod; said rod being provided with a shoulder spaced from the bracket end of said rod and having a portion of reduced diameter extending away from said shoulder toward the bracket end of the rod; a clip element grippingly embracing the tubular portion of the blade and carried by the blade for slidable adjustment with the blade longitudinally over the rod, said clip element grippingly constricting the tubular portion of the blade toward and about the reduced diameter portion of the rod holding the same to engage the shoulder on the rod to limit the slidable adjustment of the blade over the rod.

2. A visor assembly comprising, in combination: a visor blade; a visor blade-supporting bracket provided with a visor blade-supporting rod supported from one end by the bracket; said blade having a tubular portion extending along one longitudinal margin and mounted upon the rod for slidable adjustment of the blade longitudinally over the rod; said rod being provided with a shoulder spaced from the bracket end of the rod and having a portion of reduced diameter extending away from said shoulder toward the bracket end of the rod; and retaining means gripped about the tubular margin of the blade and carried thereby constricting said tubular margin of the blade about the rod and into the reduced diameter portion thereof to engage said shoulder limiting the movement of the blade longitudinally over the rod.

3. A visor assembly comprising, in combination: a visor blade; a visor blade-supporting bracket provided with a visor blade-supporting rod supported from one end by the bracket, said blade having a tubular portion extending along one longitudinal margin and mounted upon the rod for slidable adjustment of the blade longitudinally over the rod, said rod being provided with a shoulder spaced from the bracket end of the rod, said rod having a portion of reduced diameter extending away from said shoulder and terminating in an opposed shoulder nearer to the bracket end of the rod than the first shoulder; a retaining clip gripped about the tubular margin of the blade constricting said tubular portion into and against the reduced diameter portion of the rod providing a stop cooperating with either shoulder of the rod to limit the longitudinal adjustment of the blade thereover.

References Cited in the file of this patent

UNITED STATES PATENTS

| | | |
|---|---|---|
| 2,279,648 | Westrope | Apr. 14, 1942 |
| 2,360,183 | Westrope | Oct. 10, 1944 |
| 2,462,304 | Burdick | Feb. 22, 1949 |
| 2,566,523 | Holland et al. | Sept. 4, 1951 |
| 2,625,426 | Weymouth | Jan. 13, 1953 |